US008880947B2

(12) United States Patent
Tian et al.

(10) Patent No.: US 8,880,947 B2
(45) Date of Patent: Nov. 4, 2014

(54) AUTOMATIC TESTING APPARATUS

(75) Inventors: Lei Tian, Taipei Hsien (TW);
Chuan-Guo Zhang, Taipei Hsien (TW);
Bin Zhi, Taipei Hsien (TW); Shi-Ping Wu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 515 days.

(21) Appl. No.: 13/242,475

(22) Filed: Sep. 23, 2011

(65) Prior Publication Data

US 2012/0266021 A1 Oct. 18, 2012

(30) Foreign Application Priority Data

Apr. 15, 2011 (CN) .............................. 2011 1 095024

(51) Int. Cl.
*G06F 11/273* (2006.01)
(52) U.S. Cl.
CPC .................................. *G06F 11/2733* (2013.01)
USPC ................................... 714/27; 714/31; 714/37
(58) Field of Classification Search
CPC .............. G06F 11/273; G06F 11/2733; G06F 11/2736; G06F 11/2205; G06F 11/2221; G06F 11/26
USPC ................................................ 714/27, 31, 37
See application file for complete search history.

(56) References Cited

U.S. PATENT DOCUMENTS

| | | | |
|---|---|---|---|
| 7,218,094 B2 * | 5/2007 | Khandros et al. | 324/750.01 |
| 7,388,977 B2 | 6/2008 | Wang et al. | |
| 7,548,055 B2 * | 6/2009 | Khandros et al. | 324/754.03 |
| 2005/0232159 A1 * | 10/2005 | Joo et al. | 370/241 |
| 2006/0069950 A1 * | 3/2006 | Stephens et al. | 714/18 |
| 2006/0195748 A1 * | 8/2006 | Chen et al. | 714/742 |
| 2007/0089013 A1 * | 4/2007 | Qiu et al. | 714/742 |
| 2008/0097712 A1 * | 4/2008 | Bruce et al. | 702/77 |
| 2009/0052678 A1 * | 2/2009 | Cheng et al. | 381/58 |
| 2009/0241701 A1 * | 10/2009 | Pan | 73/865.9 |
| 2009/0278297 A1 * | 11/2009 | Wang et al. | 269/212 |
| 2010/0011249 A1 * | 1/2010 | Kim | 714/30 |
| 2010/0277198 A1 * | 11/2010 | Liang et al. | 324/758 |
| 2011/0022892 A1 | 1/2011 | Zhang et al. | |
| 2011/0035179 A1 * | 2/2011 | Tao et al. | 702/122 |

(Continued)

FOREIGN PATENT DOCUMENTS

| | | | | |
|---|---|---|---|---|
| CN | 1863292 | | 11/2006 | |
| CN | 101162248 | | 4/2008 | |
| CN | 101963930 | | 2/2011 | |
| EP | 848260 A2 * | 6/1998 | ............. G01R 31/01 |
| TW | 200518555 A | | 6/2005 | |
| TW | 201104270 A | | 2/2011 | |

OTHER PUBLICATIONS

Communication From the Taiwan Patent Office Regarding a Counterpart Foreign Application Dated (Taiwan Year 103) Feb. 6, 2014.

*Primary Examiner* — Chae Ko
(74) *Attorney, Agent, or Firm* — Rosenberg, Klein & Lee

(57) ABSTRACT

The present invention relates to an automatic testing apparatus used for testing a tested device. The automatic testing apparatus is fixed on a first side of a testing platform. The tested device executes a testing program while being tested, and transmits a test signal to a control unit of the testing platform for controlling a driving testing unit or a multimedia testing module to test the tested device and hence testing the tested device automatically. Thereby, testing costs can be saved and artificial factor affecting the test results can be avoided.

19 Claims, 14 Drawing Sheets

(56) References Cited

U.S. PATENT DOCUMENTS

| | | | |
|---|---|---|---|
| 2011/0072306 A1* | 3/2011 | Racey et al. | 714/27 |
| 2012/0053879 A1* | 3/2012 | Chang et al. | 702/104 |
| 2012/0136613 A1* | 5/2012 | Hill | 702/119 |
| 2012/0146956 A1* | 6/2012 | Jenkinson | 345/178 |
| 2012/0290246 A1* | 11/2012 | Bhatnagar et al. | 702/122 |
| 2013/0200913 A1* | 8/2013 | Panagas | 324/756.02 |
| 2013/0200916 A1* | 8/2013 | Panagas | 324/757.01 |

\* cited by examiner

AUTOMATIC TESTING APPARATUS

FIELD OF THE INVENTION

The present invention relates generally to a testing apparatus, and particularly to an automatic testing apparatus.

BACKGROUND OF THE INVENTION

With the progress of modern technologies, the prosperous development of information and electronics, and the advancement of semiconductor processes, their applications improve people's lives continuously. Consumer electronic products, for example, personal computers, business machines, mobile phones, tablet computers, and digital cameras, are constantly being lightened and simplified, and thereby are introduced into peoples lives. Nonetheless, before electronic products are launched to the market, the manufactures, particularly the computer manufacturers, need to perform testing on them. If flaws are found in the developed new products, the flaws have to be reported to the development department for correcting them.

In the factories of current manufacturers, testing is performed in a primitive way, namely, manual operations. Most testing operations are conducted by testers by manually switching the switches and keys on the tested device. The general testing operations include the following:
a. CRT Test: The tester connects the tested device to an external CRT screen. Then judge the images using his/her own eyes.
b. LCD Test: The tester judges the displayed results on the LCD using his/her own eyes.
c. Camera Test: The tester judges the displayed results taken by the camera using his/her own eyes.
d. Speaker Test: The tester judges the audio playing of the speaker using his/her own ears.
e. Microphone Test: The tester uses the microphone under test to record judges speech and listens to the recording using his/her own ears for judging the testing result.
f. Keyboard Test: The tester presses all keys manually for testing if they are all normal.
g. Touch Pad Test: The tester presses the touch pad and its left and right keys for testing.
h. USB Test: The tester plugs in and out of the USB connector for testing.
i. Audio Line Test: The tester plugs in and out of the audio line connector for testing.
j. HDMI Test: The tester connects an end of the HDMI connector to the HDMI port and the other end thereof to the HDMI screen. Then uses his/her ears and eyes to judge audio and video results.

Thereby, testers have to use their own eyes and ears for judging the testing results subjectively. The manual operations of testers may lead to some disadvantages. For example, inconvenience in testing operations caused by inconvenient plug-in and plug-out of test fixtures, long manual operating time, and incorrect testing operations caused by fatigue of testers. Even worse, under manual operations, erroneous judgment may occur and hence providing wrong testing results.

Accordingly, the present invention provides an automatic testing apparatus, which not only improves the problems of manual operations but also reduces testing costs by means of automatic operations.

SUMMARY

The present invention provides an automatic testing apparatus, which comprises a tested device and a testing platform. The tested device has a peripheral device and stores a testing program; the testing platform has a fixing part, a control unit, and at least a driving testing unit. The fixing part and the driving testing unit are located on a first side of said testing platform. The fixing part fixes the tested device on the first side of the testing platform. The control unit connects electrically to the driving testing unit and the tested device. When the tested device executes the testing program and transmits a test signal to the control unit, the control unit produces and transmits a control signal to the driving testing unit according to the test signal. Then the driving testing unit drives the peripheral device according to the control signal for testing the peripheral device. Thereby, the present invention provides automatic testing for avoiding artificial errors.

The present invention provides an automatic testing apparatus, which comprises a tested device and a testing platform. The tested device has a multimedia module and stores a testing program; the testing platform has a control unit, a fixing part, and a multimedia testing module. The fixing part and the multimedia testing module are located on a first side of said testing platform. The control unit is connected electrically to the tested device. The tested device executes the testing program and produces and transmits a test signal to the control unit. The control unit produces and transmits a control signal to the multimedia testing module according to the test signal for controlling the multimedia testing module. The multimedia module of the tested device extracts the first multimedia signal. The multimedia module outputs a second multimedia signal according to the first multimedia signal; and the multimedia module extracts the second multimedia signal and compares the first multimedia signal with the second multimedia signal for testing the multimedia function of a multimedia module. Thereby, the present invention provides automatic testing for avoiding artificial errors.

DETAILED DESCRIPTION

In order to make the structure and characteristics as well as the effectiveness of the present invention to be further understood and recognized, the detailed description of the present invention is provided as follows along with embodiments and accompanying figures.

Figure 1A:
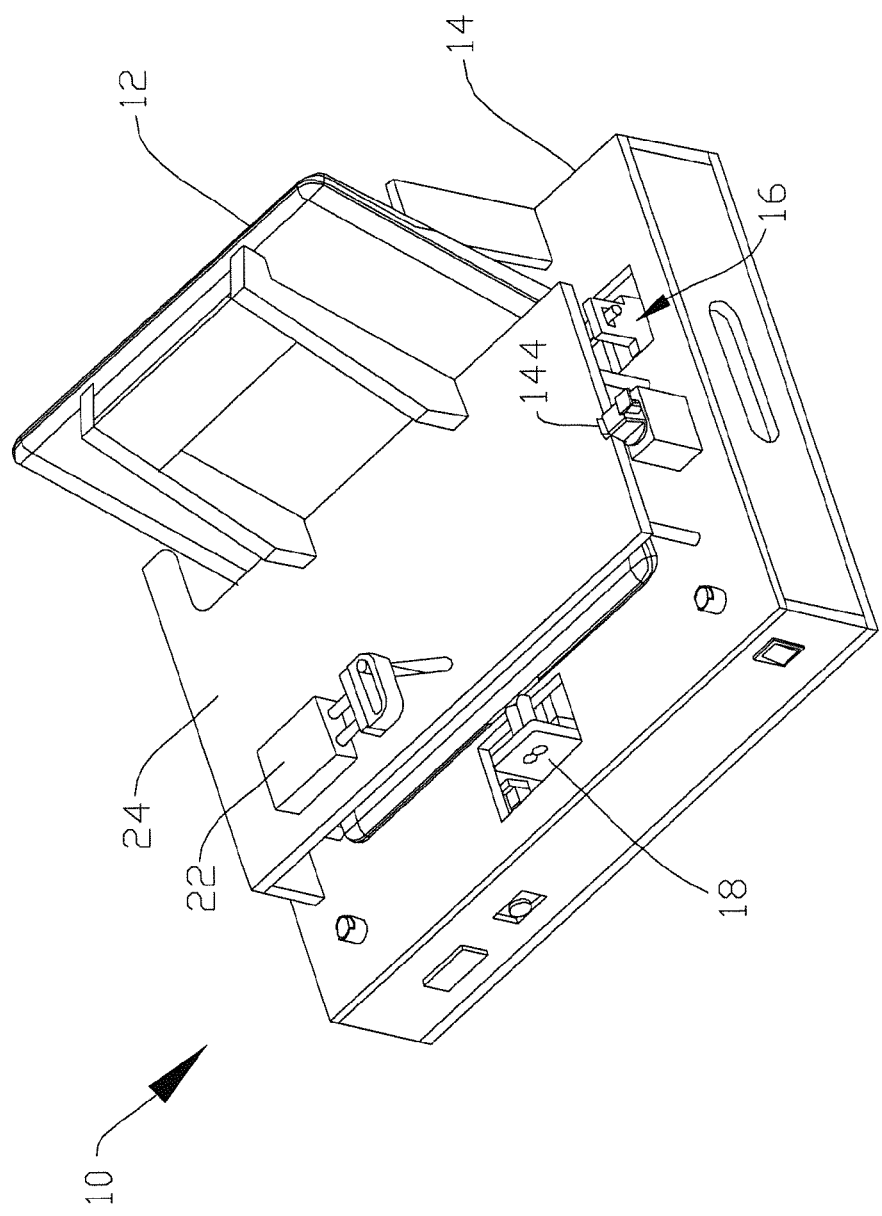
FIG. 1A shows a three-dimensional view according to a preferred embodiment of the present invention.
Figure 1B:
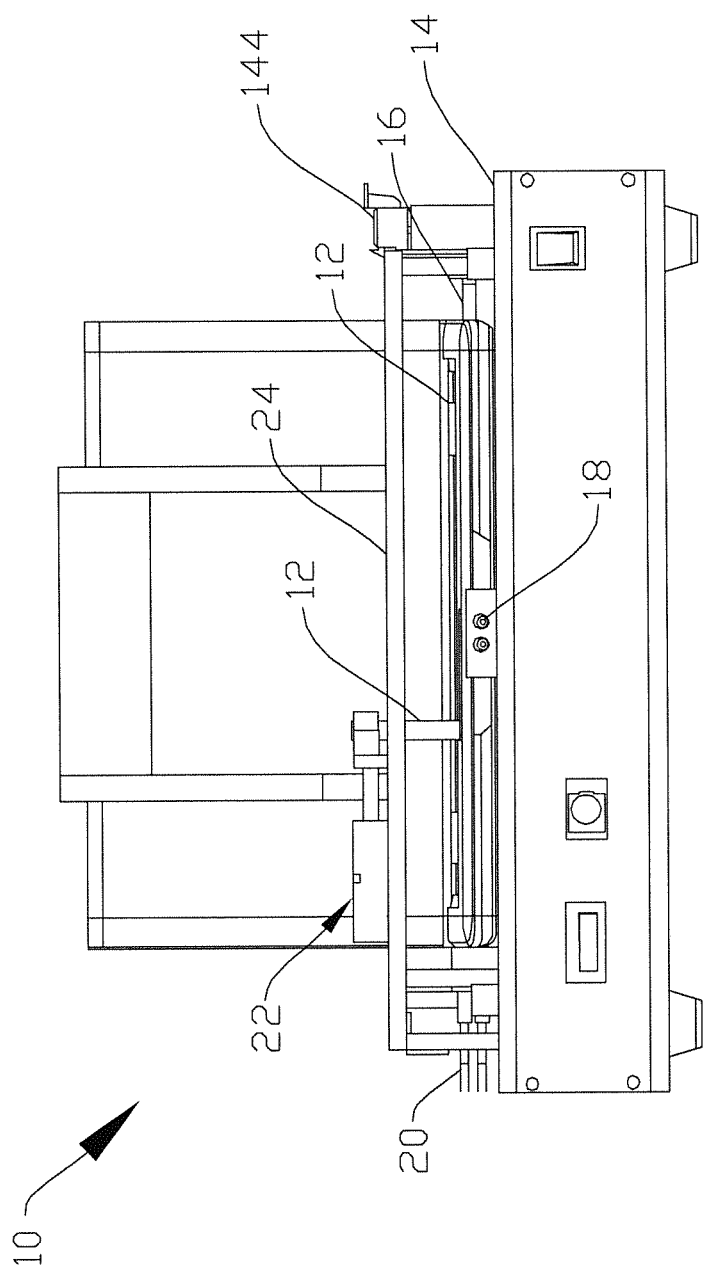
FIG. 1B shows a front view according to a preferred embodiment of the present invention.
Figure 1C:
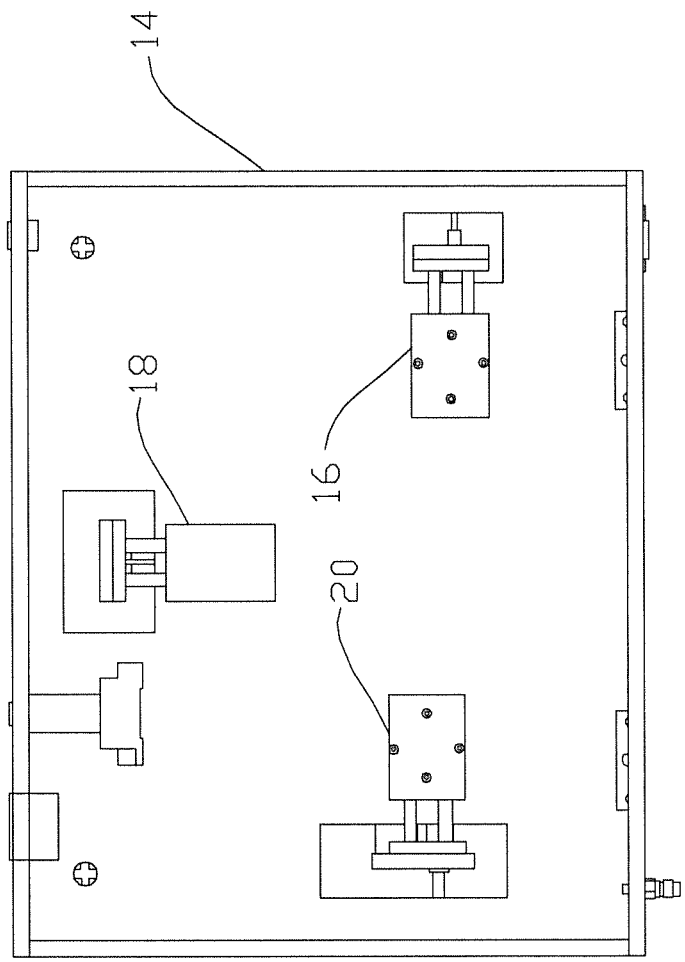
FIG. 1C shows a bottom view according to a preferred embodiment of the present invention.

FIGS. 1A to 1C show schematic diagrams according to a preferred embodiment of the present invention. As shown in the figures, the present invention provides an automatic testing apparatus 10, which comprises a tested device 12 and a testing platform 14. The testing platform 14 includes a control unit 142, a fixing part 144, and at least a driving testing unit. According to the present embodiment, a first driving testing unit 16, a second driving testing unit 18, a third driving testing unit 20, a fourth driving testing unit 22, and a fifth driving testing unit 24 are used as an example.

Figure 2A:
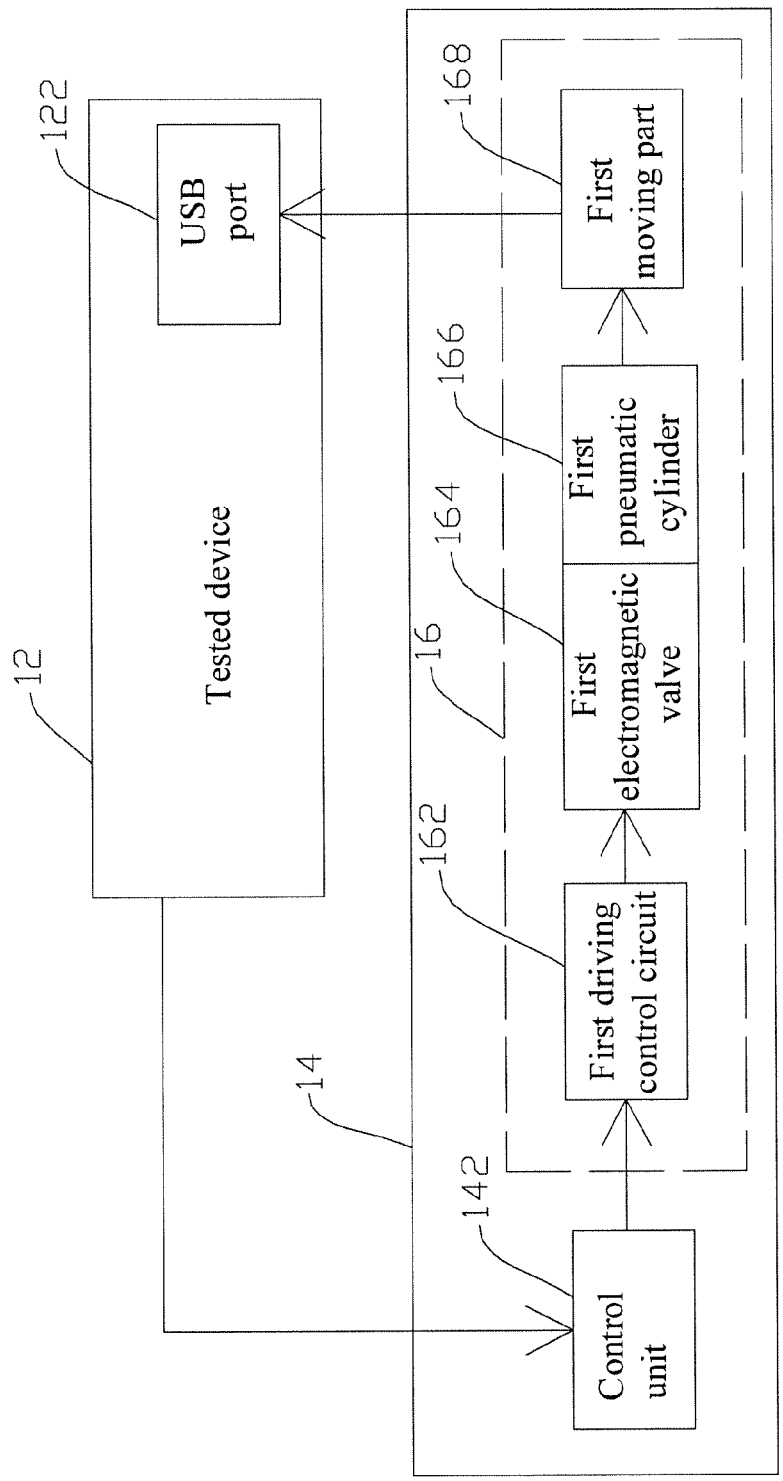
FIG. 2A shows a block diagram of the first driving testing unit according to the present invention.
Figure 2B:
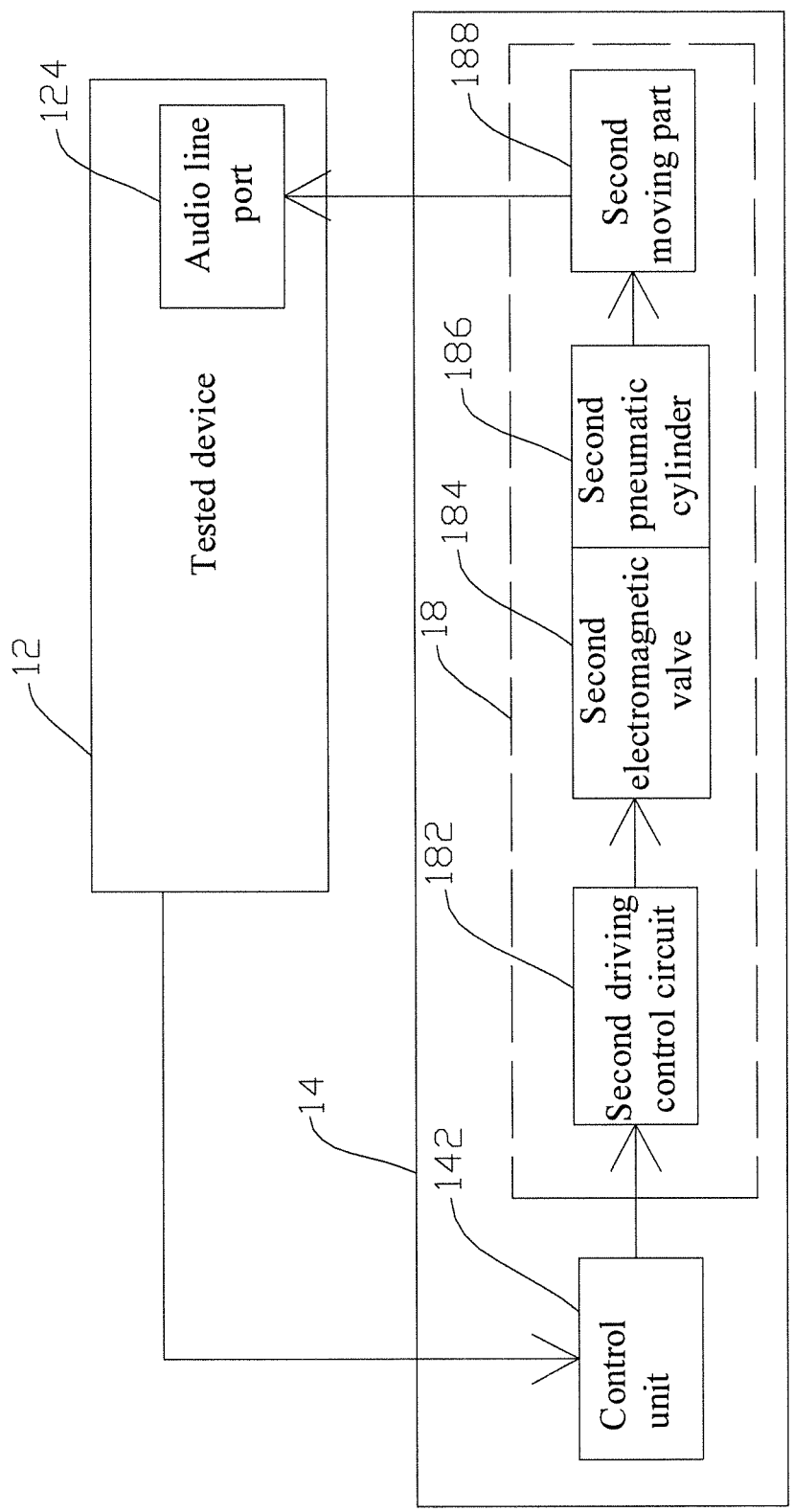
FIG. 2B shows a block diagram of the second driving testing unit according to the present invention.
Figure 2C:
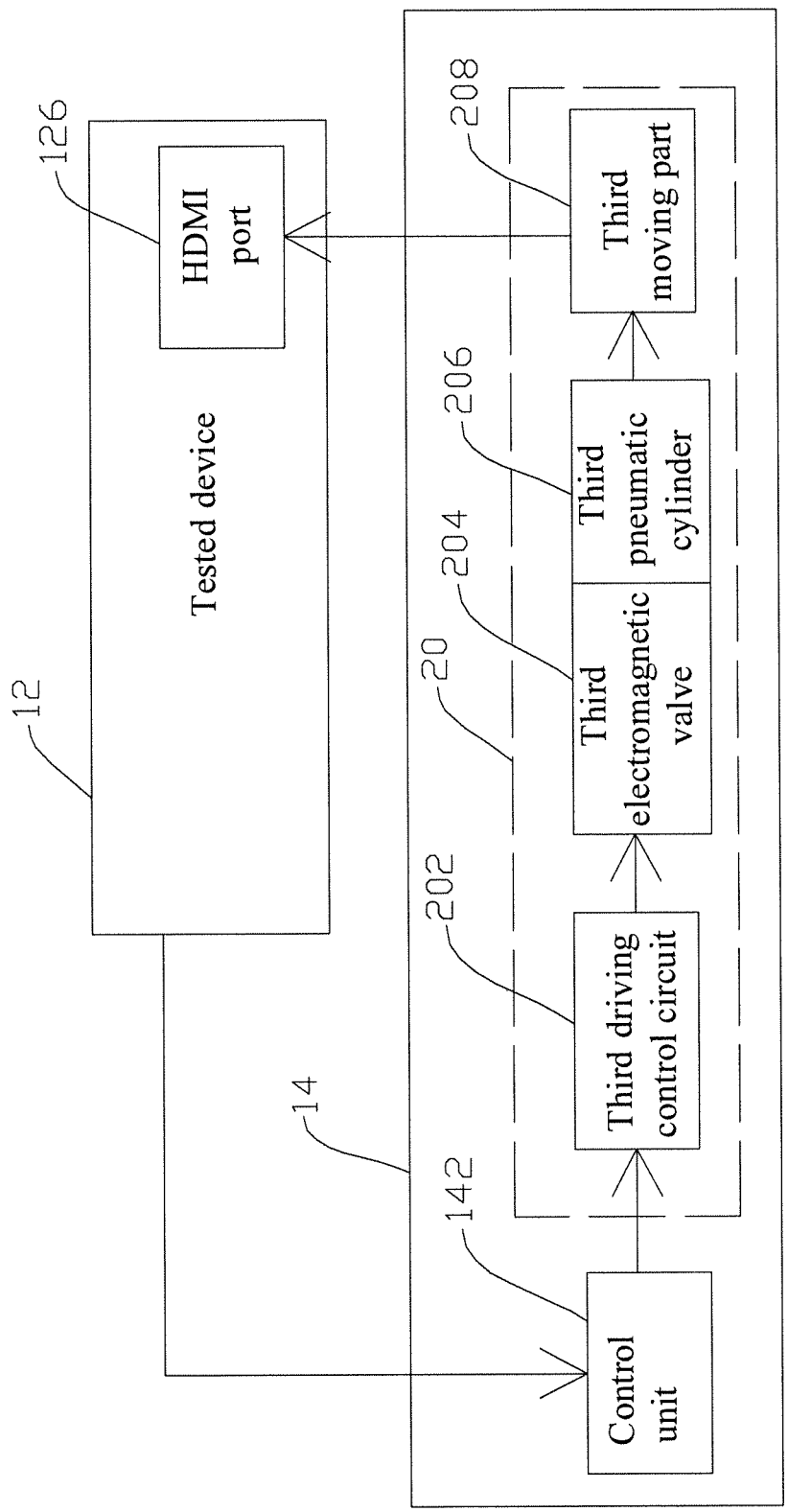
FIG. 2C shows a block diagram of the third driving testing unit according to the present invention.
Figure 2D:
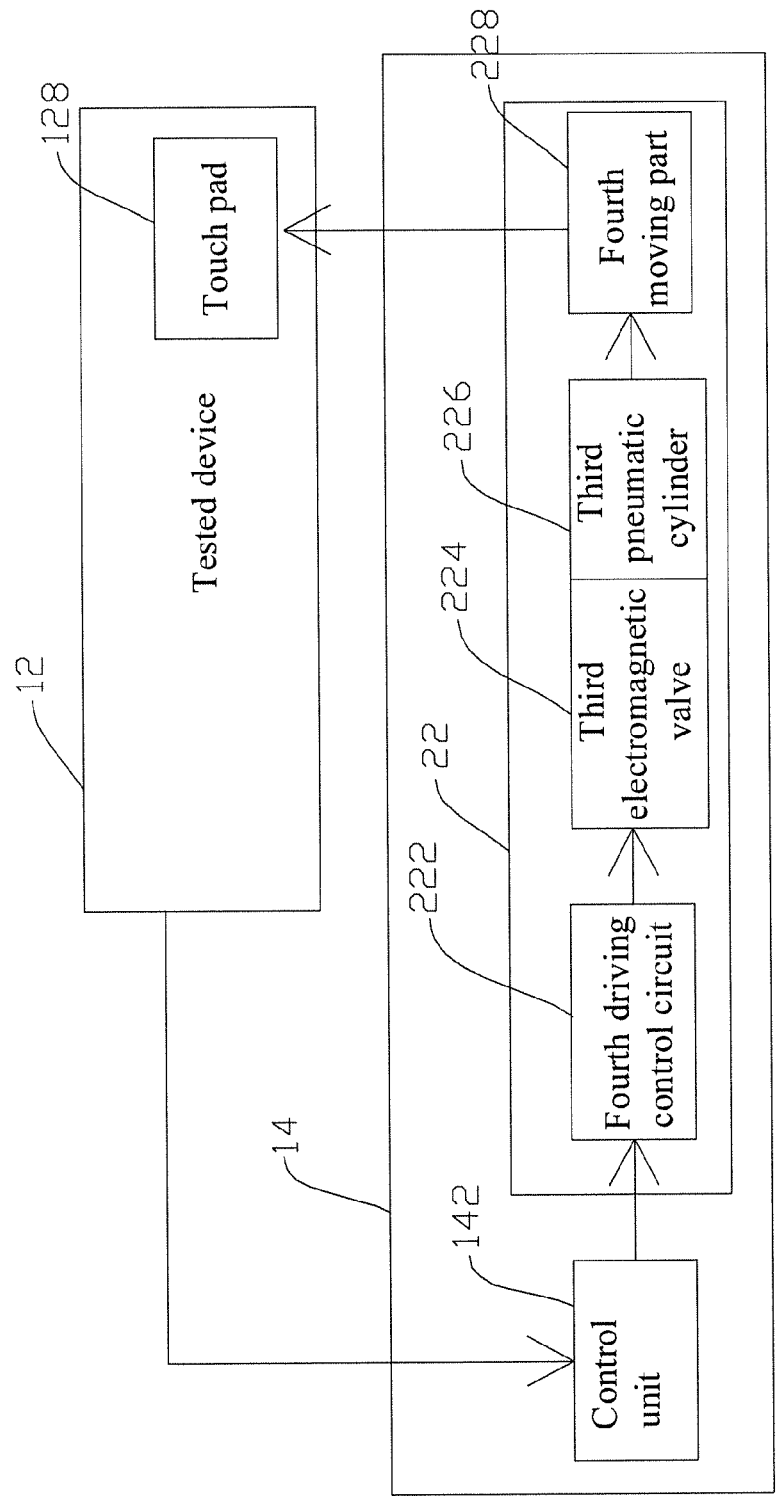
FIG. 2D shows a block diagram of the fourth driving testing unit according to the present invention.
Figure 2E:
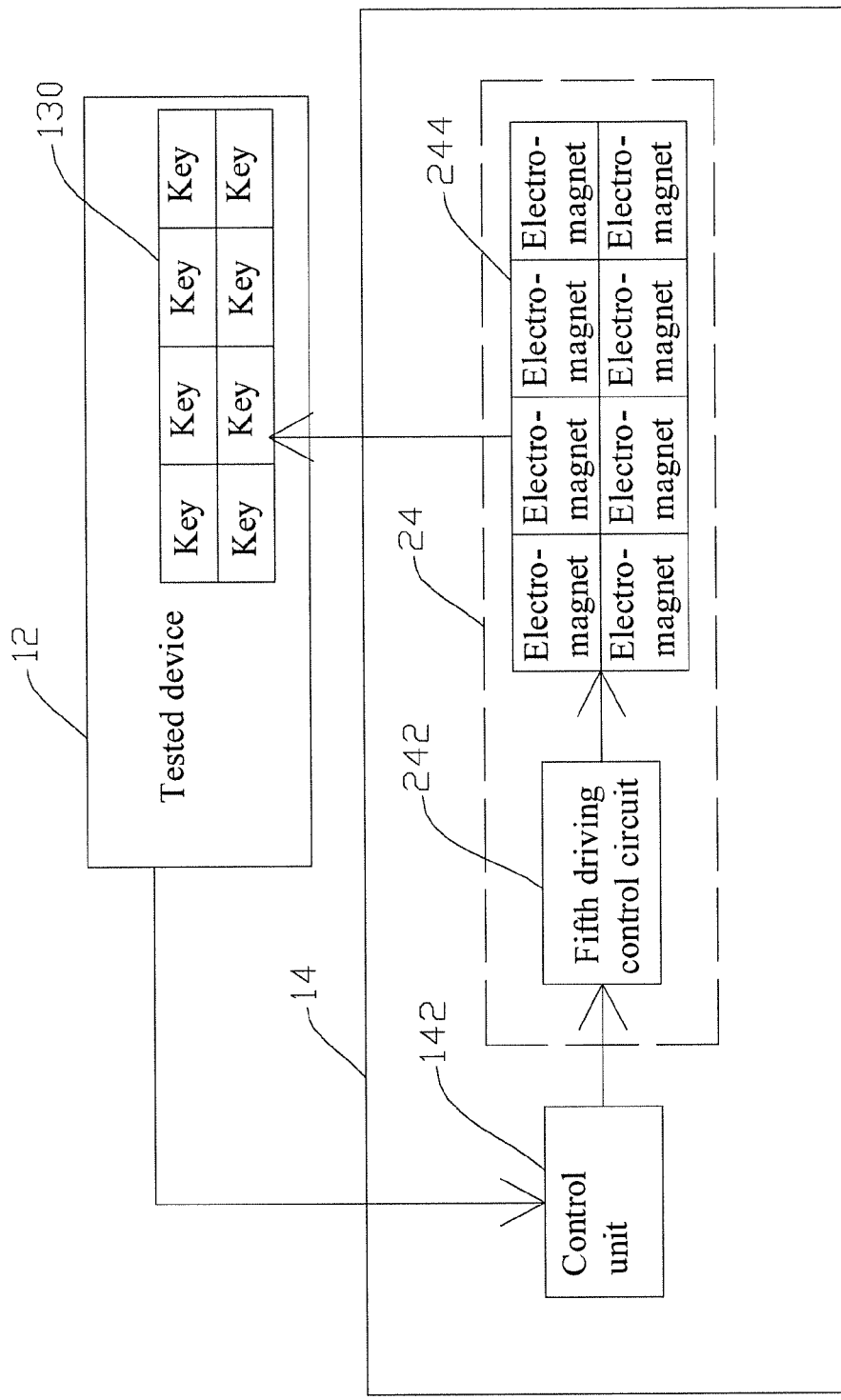
FIG. 2E shows a block diagram of the fifth driving testing unit according to the present invention.

The tested device 12 according to the present embodiment is a portable computer, which has a USB port 122 (ash shown in FIG. 2A), an audio line port 124 (as shown in FIG. 2B), an HDMI port 126 (as shown in FIG. 2C), a touch pad 128 (as shown in FIG. 2D), and a plurality of keys 130 (as shown in FIG. 2E). While testing the tested device 12, the testing platform 14 connects to the USB port 122 of the tested device 12 via the first driving testing unit 16; the testing platform 14 connects to the audio line port 124 of the tested device 12 via the second driving testing unit 18; the testing platform 14 connects to the HDMI port 126 of the tested device 12 via the third driving testing unit 20; the testing platform 14 connects to the touch pad 128 of the tested device 12 via the fourth driving testing unit 22; and the testing platform 14 connects to the plurality of keys 130 of the tested device 12 via the fifth driving testing unit 24.

The control unit 142 is a control circuit of the testing platform 14 and includes an 8051 single chip. According to the present embodiment, the control unit 142 connects electrically to the USB port of the tested device 12 via an RS232-to-USB converter. However, the present invention is not limited to embodiment but can adjust according to the transmission interface supported by the control unit 142. For example, the control unit 142 can connect to the IEEE1394 port of the tested device 12 using an IEEE1394 connector or an RS232-to-IEEE1394 converter. The tested device 12 stores a testing program for testing the tested device 12. While starting testing the tested device 12, the tested device 12 executes the testing program, and produces and transmits a corresponding test signal to the control unit 142. The control unit 142 hence produces and transmits a corresponding control signal to the first, the second, the third, the fourth, and the fifth driving testing units 16, 18, 20, 22, 24 for testing the USB port 122, the audio line port 124, the HDMI port 126, the touch pad 128, and the plurality of keys 130 of the tested device 12, respectively. The fixing part 144 is used for fixing the tested device 12 on a first side of the testing platform 14 so that the USB port 122, the audio line port 124, the HDMI port 126, the touch pad 128, and the plurality of keys 130 can correspond to the first, the second, the third, the fourth, and the fifth driving testing units 16, 18, 20, 22, 24.

As shown in FIG. 2A, the first driving testing unit 16 comprises a first driving control circuit 162, a first electromagnetic valve 164, a first pneumatic cylinder 166, and a first moving part 168. The first driving control circuit 162 connects electrically with the control unit 142 and the first electromagnetic valve 164; the first electromagnetic valve 164 communicates with the first pneumatic cylinder 166; the first pneumatic cylinder 166 connects with the first moving part 168; and the first moving part 168, which is a USB connector, corresponds to the USB port of the tested device 12. When the testing of the USB port 122 starts, the tested device 12 transmits a first test signal to the control unit 142 according to the testing program to make the control unit 142 produce a first activation control signal to the first driving control circuit 162 correspondingly. The first driving control circuit 162 drives the first electromagnetic valve 164 according to the first activation control signal, so that the first electromagnetic valve 164 can control air intake into the first pneumatic cylinder 166 for driving the first moving part 168 to plug into and test the USB port 122. When the testing is over, the tested device 12 produces a first end signal to the control unit 142 according to the testing program. The control unit 142 produces a first end control signal to the first driving control circuit 162 correspondingly. The first driving control circuit 162 drives the first electromagnetic valve 164 to control exhaust of the first pneumatic cylinder 166 for driving the first moving part 168 to eject from the USB port 122.

As shown in FIG. 2B, the second driving testing unit 18 comprises a second driving control circuit 182, a second electromagnetic valve 184, a second pneumatic cylinder 186, and a second moving part 188. The connection of the second driving control circuit 182 with the second moving part 188 is similar to the connection of the first driving control circuit 162 of the first driving testing unit 16 with the first moving part 168, and hence will not be described again. The difference between FIG. 2A and FIG. 2B is that the first moving part 168 is a USB connector, while the second moving part 188 is an audio connector. When the testing of the audio line port 124 starts, the tested device 12 transmits a second test signal to the control unit 142 according to the testing program to make the control unit 142 produce a second activation control signal to the second driving control circuit 182 correspondingly for driving the second electromagnetic valve 184 to control air intake into the second pneumatic cylinder 186, and thus driving the second moving part 188 to plug into and test the audio line port 124. When the testing is over, the tested device 12 produces a second end signal to the control unit 142 according to the testing program. The control unit 142 then produces a second end control signal to the second driving control circuit 182 correspondingly for driving the second electromagnetic valve 184 to control exhaust of the second pneumatic cylinder 186 and, hence driving the second moving part 188 to eject from the audio line port 124.

As shown in FIG. 2C, the third driving testing unit 20 comprises a third driving control circuit 202, a third electromagnetic valve 204, a third pneumatic cylinder 206, and a third moving part 208. The difference between the second driving testing unit 18 and the third driving testing unit 20 is that the second moving part 188 is an audio connector for testing the audio line port 124, while the third moving part 208 is an HDMI connector for testing the HDMI port 126. Thereby, the connection of the third driving control circuit 202 with the third moving part 208 is similar to the connection of the second driving control circuit 182 of the second driving testing unit 18 in FIG. 2B with the second moving part 188, and hence will not be described again. When the testing of the HDMI port 126 starts, the tested device 12 transmits a third test signal to the control unit 142 according to the testing program for transmitting a third activation control signal to the third driving control circuit 202 correspondingly for driving the third electromagnetic valve 204 to control air intake into the third pneumatic cylinder 206, and thus driving the third moving part 208 to plug into and test the HDMI port 126. When the testing is over, the tested device 12 produces a third end signal to the control unit 142 according to the testing program. The control unit 142 then produces a third end control signal to the third driving control circuit 202 correspondingly for driving the third electromagnetic valve 204 to control exhaust of the third pneumatic cylinder 206, and hence driving the third moving part 208 to eject from the HDMI port 126.

As shown in FIG. 2D, the fourth driving testing unit 22 comprises a fourth driving control circuit 222, a fourth electromagnetic valve 224, a fourth pneumatic cylinder 226, and a fourth moving part 228. The difference between the third driving testing unit 20 and the fourth driving testing unit 22 is that the third moving part 208 is an HDMI connector for testing the HDMI port 126, while the fourth moving part 228 is a touch unit, such a touch stylus, for testing the touch pad 128. Thereby, the connection of the fourth driving control circuit 222 with the fourth moving part 228 is similar to the connection of the third driving control circuit 202 of the third driving testing unit 20 in FIG. 2C with the third moving part 208, and hence will not be described again. Nonetheless, the fourth moving part 228 pushes against the touch pad 128 for moving thereon, which is different from the case the third moving part 208 plugs into or ejects from the port by the control of the third pneumatic cylinder 206. While testing the touch pad 128, the tested device 12 produces an advance test signal to the control unit 142 according to the testing program and transmits an advance control signal to the fourth driving control circuit 222 for driving the fourth electromagnetic valve 224 to control air intake of the fourth pneumatic cylinder 226, and thus driving the fourth moving part 228 to move from one side of the touch pad 128 to the other side thereof. Thereby, the touch pad 128 can be tested. While performing recovery testing, the tested device 12 produces a recovery test signal to the control unit 142 according to the testing program and transmits a recovery control signal to the fourth driving control circuit 222 for driving the fourth electromagnetic valve 224 to control exhaust of the fourth pneumatic cylinder 226, and hence driving the fourth moving part 208 to recover. Accordingly, the touch functions of the touch pad 128 can be tested by moving and recovery of the fourth moving part 228.

As shown in FIG. 2E, the fifth driving testing unit 24 comprises a fifth driving control circuit 242 and a plurality of electromagnets. The difference between the fourth driving testing unit 22 and the fifth driving testing unit 24 is that the fourth driving testing unit 22 uses the fourth pneumatic cylinder 226 to move the fourth moving part 228 for testing the touch pad 128, but the fifth driving testing unit 24 controls the electromagnets 244 to press the keys 130 for testing the keys 130. The fifth driving control circuit 242 connects electrically with the control unit 142 and the plurality of electromagnets 244. According to the present embodiment, eight electromagnets 244 are used as an example. However, the present invention is not limited to the number of the electromagnets 244. The fifth driving testing unit 24 can dispose the electromagnets 244 with the number corresponding to that of the keys 130. According to the prior art, keyboard testing is performed by testers by manually pressing all keys. According to the present invention, while testing the keyboard, the control unit 142 of the automatic testing apparatus connects to the USB port of the tested device 12 via the RS232-to-USB converter. Then the control unit 142 controls the fifth driving control circuit 242 for driving the electromagnets 242 to press the corresponding keys 130. In other words, the electromagnets 242 are driven to press the keys 130 on the tested device 12 for testing. Thereby, testers are not required to press the keys 130 on the tested device 12. Instead, the testing platform 14 will finish the testing of the keys 130 automatically.

Accordingly, while testing various ports, touch pads, or keys of the tested device 12, the present invention can perform automatic testing. No tester is required to connect the connectors to the tested device 12 or to press the touch pad or keys manually. Consequently, the testing costs can be saved as well as avoiding errors caused by artificial operations.

The above description aims at tests of input/output devices such as connection ports, touch pad, or keys according to the present invention. Nevertheless, the present invention is not limited to the tests but also applied to tests of output signals.

Figure 3:
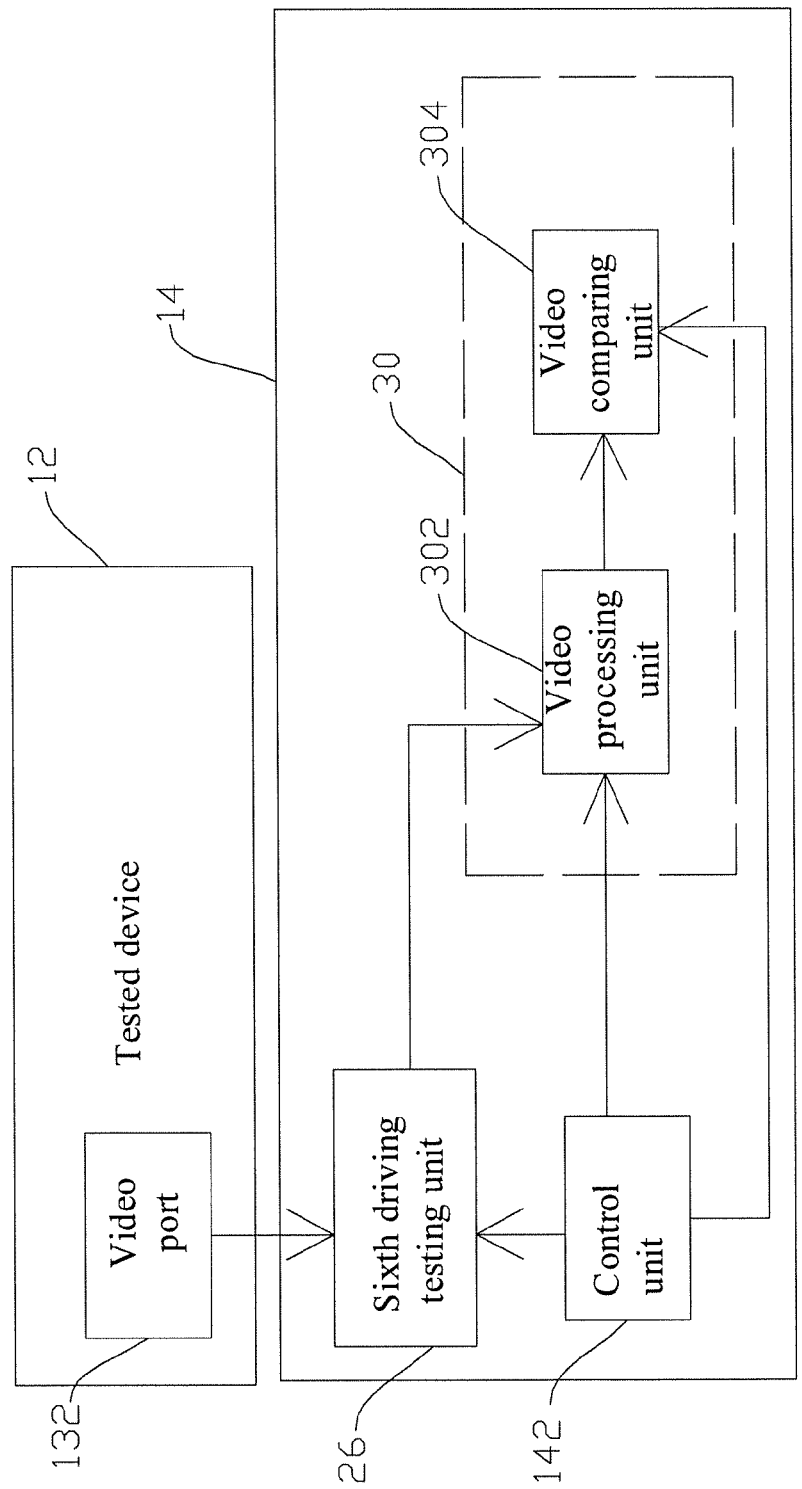
FIG. 3 shows a block diagram according to another preferred embodiment of the present invention.

As shown in FIG. 3, the testing platform 14 further comprises a screen testing circuit 30, which includes a video processing unit 302 and a video comparing unit 304. The video processing unit 302 connects electrically to a video port 132 via a sixth driving testing unit 26. The video processing unit 302 extracts the video signal output by the tested device 12 via the video port 132, and converts the video signal into a monochromatic output signal, for example, converting an RGB video signal into an R video signal, a G video signal, and a B video signal, for the video comparing unit 304 to compare the three primary colors in the RGB video signal. Under the normal working condition, the tested device 12 can output the RGB video signal via the video port 132 normally. Thereby, the testing result of the screen testing circuit 30 shows normal for the function of external screen of the tested device 12. When the tested device 12 cannot output the RGD video signal via the video port 132, the testing result of the screen testing circuit 30 shows abnormal for the function of external screen of the tested device 12. Besides, the video comparing unit 304 further compares the horizontal synchronous signal (H_VSYNC) with the vertical synchronous signal (V_VSYNC) for confirming the influences of the horizontal and vertical synchronous signals on the RGB video signal. In addition to testing the output video signal, the screen testing circuit 30 further can test the input video signal. Thereby, in addition to being a video output port of the tested device 12, the video port 132 can also be a video input port thereof.

Figure 4:
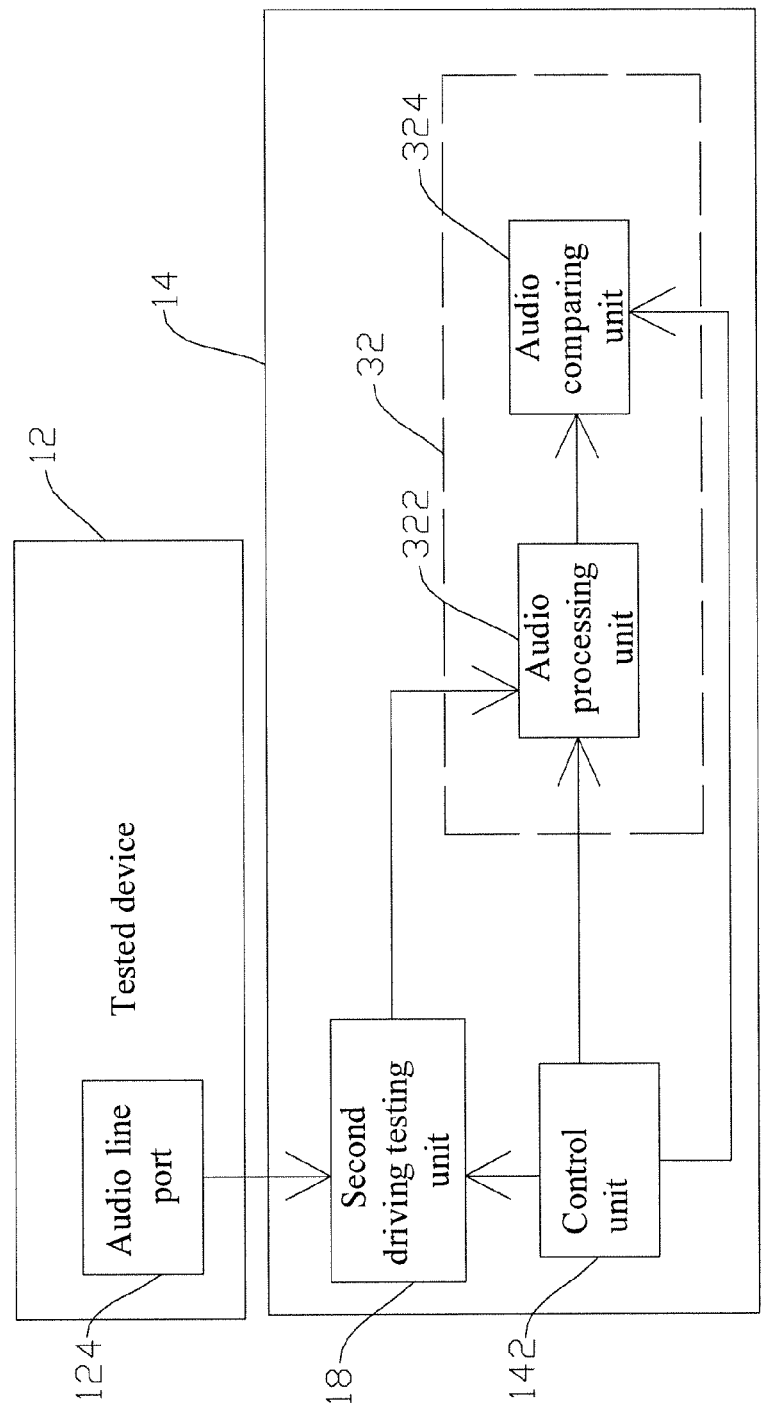
FIG. 4 shows a block diagram according to another preferred embodiment of the present invention.

As shown in FIG. 4, the testing platform 14 further comprises an audio testing circuit 32, which includes an audio-processing unit 322 and an audio-comparing unit 324. The control unit 142 controls the second driving testing unit 18 to connect to the audio line port 124. Thereby, the audio-processing unit 322 is connected electrically to the audio line port 124 via the second driving testing unit 18. The control unit 142 controls the audio-processing unit 322 to receive the audio signal produced by the tested device 12 according to the testing program, converts the audio signal to a left-channel signal and a right-channel signal, and transmits them to the audio-comparing unit 324. Then the control unit 142 controls the audio-comparing unit 324 and compares the left-channel signal with the right-channel signal for testing the audio output and input functions of the audio line port 124.

Figure 5:
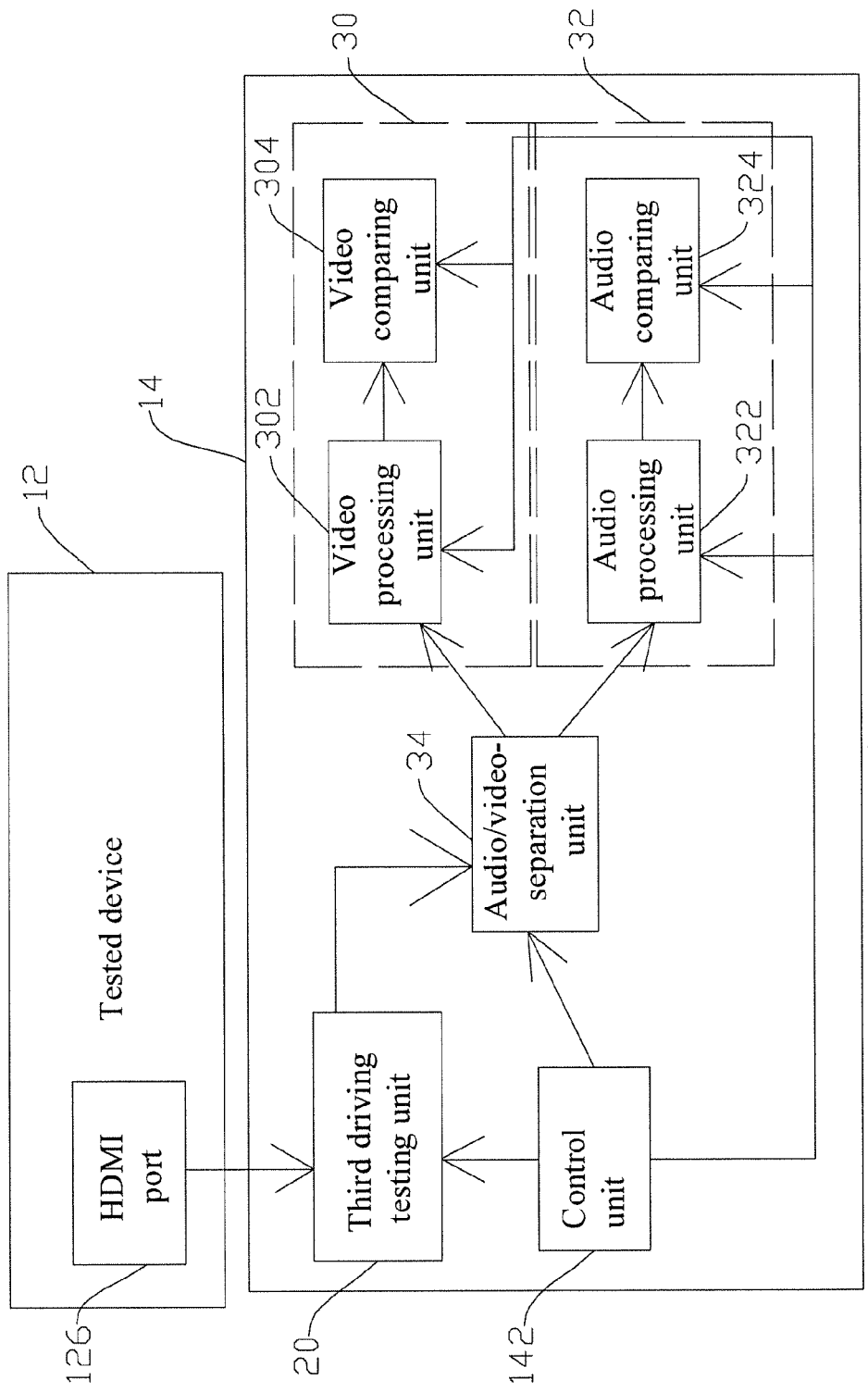
FIG. 5 shows a block diagram according to another preferred embodiment of the present invention.

As shown in FIG. 5, further in view of FIG. 2C the testing platform 14 further comprises an audio/video-separation unit 34, which is connected electrically with the third moving part 208 (namely, the HDMI connector) of the third driving testing unit 20, the screen testing circuit 30, and the audio testing circuit 32. While the testing platform 14 is testing the HDMI port 126, the testing platform 14 extracts the HDMI audio/video signal of the tested device 12. A general HDMI audio/video signal includes a video signal and an audio signal. Thereby, the video signal and the audio signal are first separated by the audio/video-separation unit 34 in the testing platform 14, and hence they are transmitted to the screen testing circuit 30 and the audio testing circuit 32, respectively. The video processing unit 302 converts the video signal to a monochromatic video signal for comparing by the video comparing unit 304. The audio-processing unit 322 converts the audio signal to a left-channel audio signal and a right-channel audio signal for comparing by the audio-comparing unit 324. Thereby, the testing platform 14 can test the output functions as well as the input functions of the HDMI signal via the HDMI port 126 of the tested device 12.

Figure 6:
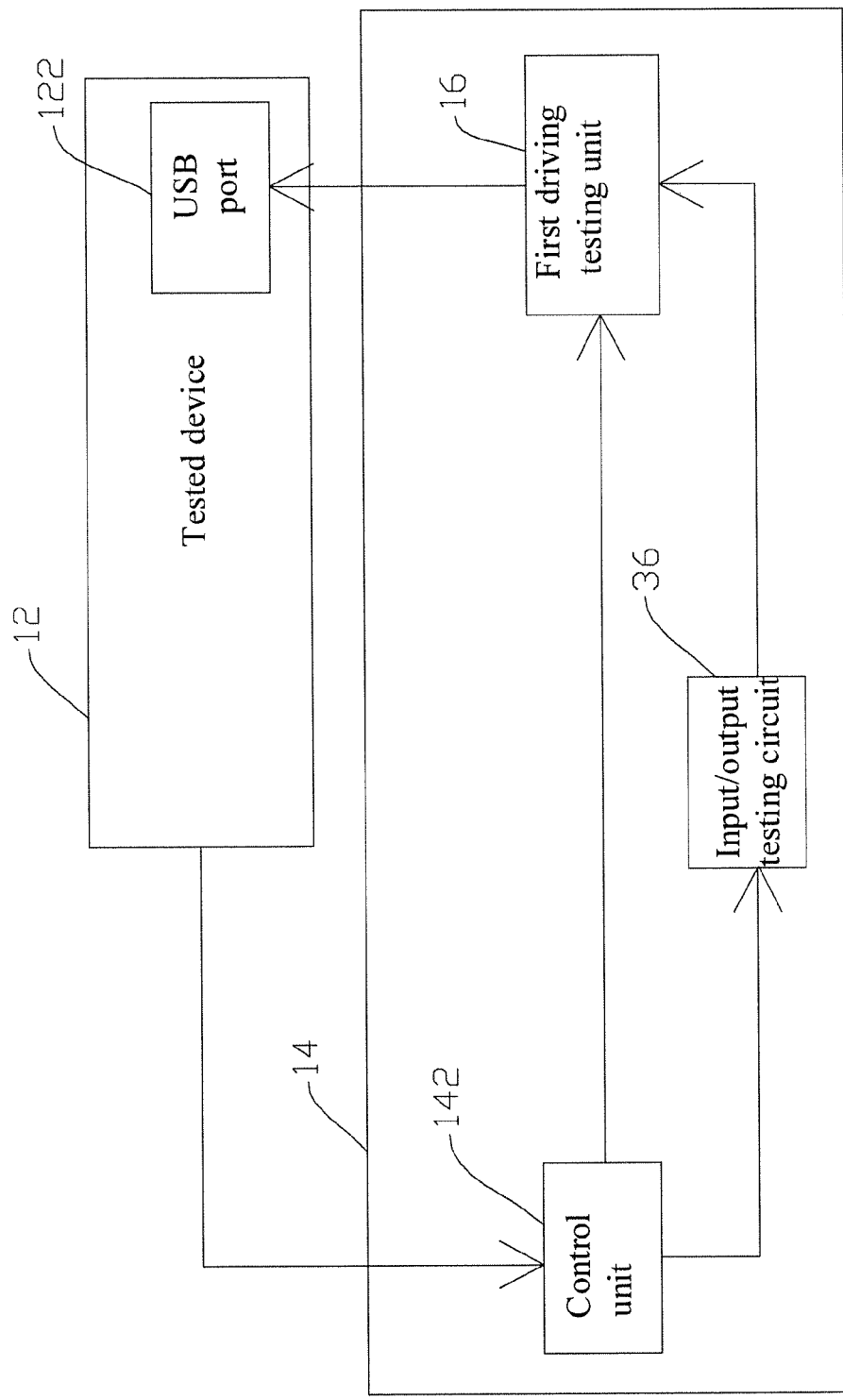
FIG. 6 shows a block diagram according to another preferred embodiment of the present invention.

As shown in FIG. 6, the testing platform 14 further comprises an input/output testing circuit 36, which connects electrically to the USB port 122 via the first driving testing unit 16. The input/output testing circuit 36 performs testing according to the hot-plug function of the USB port 122 for testing the USB port 122. In addition, the input/output testing circuit 36 can further test the other ports having the hot-swap function via the other corresponding hot-swap connectors, such as the FireWire (IEEE1394) and External Serial Advanced Technology Attachment (eSATA).

The description above provides embodiments of automatic tests for the output signals of the tested device 12 according to the present invention. Besides, the present invention further performs tests for the built-in audio/video multimedia device of the tested device 12. Thereby, the testing platform 14 according to the present invention further comprises at least a multimedia testing module for testing the audio/video multimedia module of the tested device 12, such as the display and the camera, or the speaker and the microphone.

Figure 7:
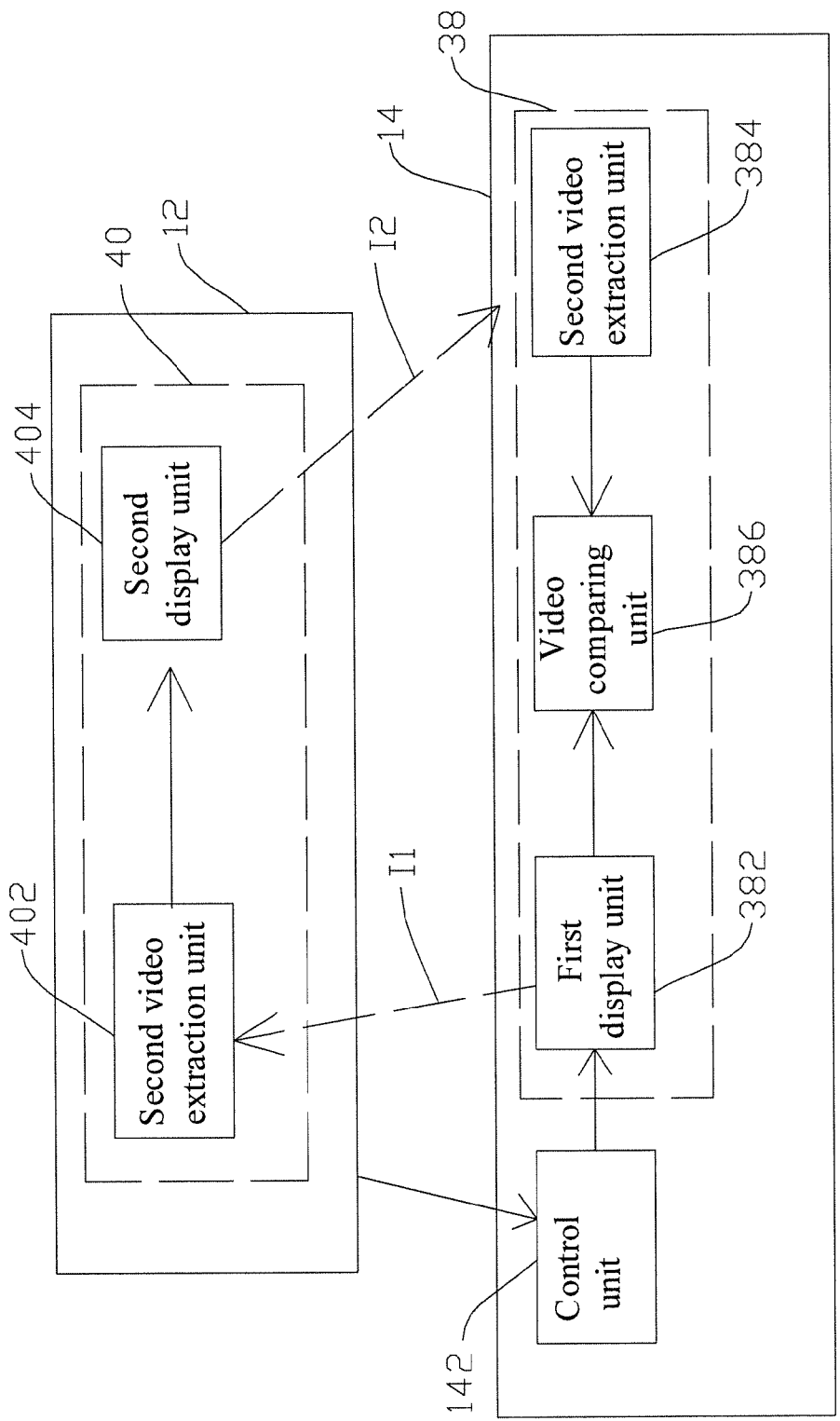
FIG. 7 shows a block diagram according to another preferred embodiment of the present invention.

FIG. 7 shows a block diagram according to another embodiment of the present invention. As shown in the figure, the platform 14 according to the present invention further comprises a video multimedia testing module 38, which includes a first display unit 382, a first video extraction unit 384, and an video comparing unit 386 for testing a video multimedia module of the tested device 12. The video multimedia module 40 includes a second video extraction unit 402 and a second display unit 404. The first display unit 361 corresponds to the second video extraction unit 402; the first video extraction unit 384 corresponds to the second display unit 404. The first and the second video extraction units 384, 404 are the cameras for mobile devices. The tested device 12 produces a display test signal and transmits it to the control unit 142 according to the testing program for driving the control unit 142 to control the first display unit 382 to display a first video signal I1. The second video extraction unit 404 extracts the first video signal I1 display on the first display unit 382. The second display unit 402 displays a second video signal I2 according to the first video signal I1 extracted by the first video extraction unit 404. The first video extraction unit 384 extracts the second video signal I2 display on the second display unit 402. The video comparing unit 386 reads and comparing the first and the second video signals I1, I2 for testing the video multimedia module 40 of the tested device 12.

Figure 8:
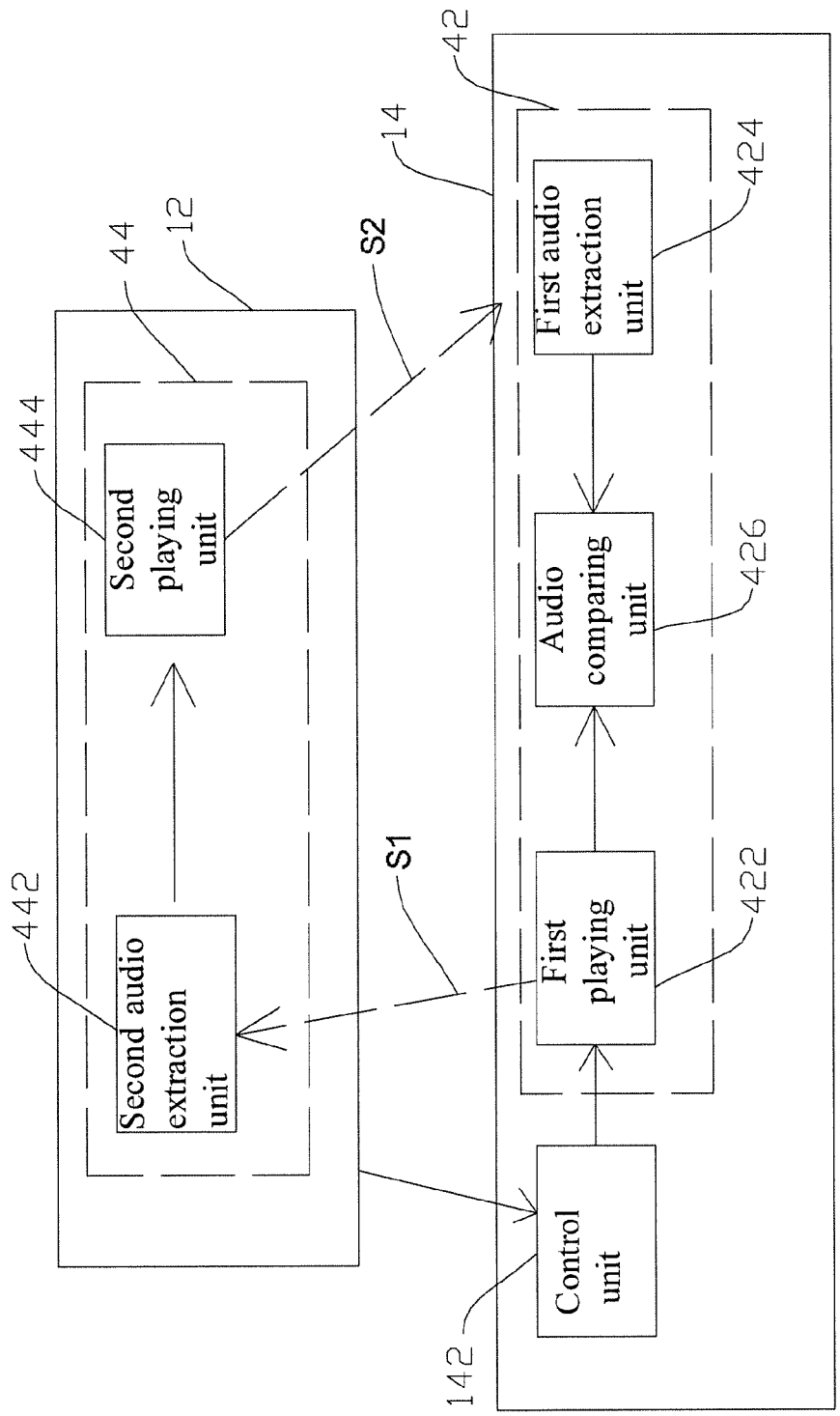
FIG. 8 shows a block diagram according to another preferred embodiment of the present invention.

FIG. 8 shows a block diagram according to another embodiment of the present invention. As shown in the figure, the testing platform 14 according to the present invention further comprises an audio multimedia testing module 42, which includes a first playing unit 422, a first audio extraction unit 424, and an audio-comparing unit 426 for testing an audio multimedia module 44 of the tested device 12. The audio multimedia module 44 includes a second audio extraction unit 442 and a second playing unit 444. The first playing unit 422 corresponds to the second audio extraction unit 442; the first audio extraction unit 424 corresponds to the second playing unit 444. The first and the second audio extraction units 424, 442 are microphones; the first and the second playing units 422, 444 are speakers. The tested device 12 produces an audio test signal and transmits it to the control unit 142 according to the executed testing program for driving the control unit 142 to control the first playing unit 422 to play a first audio signal S1. The second audio extraction unit 442 extracts the first audio signal S1 played by the first playing unit 422. The second playing unit 444 plays a second audio signal S2 according to the first audio signal S1 extracted by the second audio extraction unit 442. The first audio extraction unit 424 extracts the second audio signal S2 played by the second playing unit 444. The audio-comparing unit 426 reads and compares the first and the second audio signals S1, S2 for testing the audio multimedia module 44 of the tested device 12.

It is known from above that the testing platform 14 according to the present invention can automatically achieve (a) CRT Test; (b) LCD Test; (c) Camera Test; (d) Speaker Test; (e) Microphone Test; (f) Keyboard test; (g) Touch Pad Test; (h) USB Test; (i) Audio Line Test; (j) HDMI Test. No matter external ports, arbitrary input/output devices, or output signals can be tested automatically according to the present invention. Thereby, manual errors can be prevented and testing costs can be drastically reduced.

To sum up, the present invention provides an automatic testing apparatus, which uses a control unit to control driving testing units for driving connectors or touch units and thus testing the connection ports or touch pads of a tested device. Besides, the present invention can further uses the control unit for controlling a key testing unit for pressing and testing the keys on the tested device. Thereby, the present invention can test the tested device automatically by means of the driving testing units. No manual operations of testers are required for testing the tested device, and hence avoiding artificial factors affecting the testing result as well as reducing testing costs.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. An automatic testing apparatus, comprising:
   a tested device, having a peripheral device, and storing a testing program; and
   a testing platform, having a fixing part, a control unit, and at least a driving testing unit, said fixing part and said driving testing unit located on a first side of said testing platform, said fixing part fixing said tested device on said first side of said testing platform, and said control unit connected electrically to said driving testing unit and said tested device;
   where said tested device executes said testing program and transmits a test signal to said control unit;
   said control unit produces a control signal and transmits it to said driving testing unit according to said test signal; and
   said driving testing unit drives said peripheral device to connect with said tested device according to said control signal for testing said peripheral device;
   said peripheral device is a connection port, and said driving testing unit comprises:
   a driving control circuit, connected electrically to said control unit, and receiving said control signal;
   an electromagnetic valve, connected electrically to said driving control circuit, and said driving control circuit driving on/off of said electromagnetic valve according to said control signal;
   a pneumatic cylinder, connected to said electromagnetic valve; and
   a moving part, corresponding to said connection port and connected to said pneumatic cylinder, and said pneumatic cylinder driving said moving part to plug into said connection port for testing said connection port according to the on/off state of said electromagnetic valve.

2. The automatic testing apparatus of claim 1, wherein said peripheral device is a video port, and said testing platform further comprises a screen testing circuit, connected electrically to said driving testing unit, connected electrically to said video port of said tested device via said driving testing unit, and said tested device producing a video signal according to said testing program and outputting said video signal to said screen testing circuit for testing the video outputting functions of said video port.

3. The automatic testing apparatus of claim 2, wherein said testing platform further comprises an input/output testing circuit, connected electrically to said driving testing unit, connected electrically to an input/output port of said tested device via said driving testing unit for testing the hot-plug function of said input/output port.

4. The automatic testing apparatus of claim 3, wherein said peripheral device is an audio line port, and said testing platform further comprises an audio testing circuit, connected electrically to said driving testing unit, connected electrically to said audio line port via said driving testing unit, said tested device producing and transmitting an audio signal to said audio line port according to said testing program, and testing said audio signal according to said audio line port for testing said audio line port.

5. The automatic testing apparatus of claim 4, wherein said peripheral device is an HDMI port, and said testing platform further comprises: an audio/video-separation unit, connected electrically to said driving testing unit, connected electrically to said HDMI port and extracting an HDMI AV signal, and separating said HDMI AV signal and outputting a video signal and an audio signal; an audio testing circuit, connected electrically to said audio/video-separation unit and receiving said audio signal for testing said audio signal of said HDMI AV signal; and a screen testing circuit, connected electrically to said audio/video-separation unit and receiving said video signal for testing said video signal of said HDMI AV signal.

6. The automatic testing apparatus of claim 5, wherein said driving testing unit comprises:
a driving control circuit, connected electrically to said control unit; and
a plurality of electromagnets, corresponding a plurality of keys of said tested device, connected electrically to said driving control circuit, and said driving control circuit driving said plurality of electromagnets to pressing said plurality of keys according to said control signal for testing the input functions of said plurality of keys.

7. The automatic testing apparatus of claim 6, wherein the tested device further comprising a multimedia module, the testing platform further comprising a multimedia testing module, said multimedia testing module located on a first side of said testing platform, said tested device executes said testing program and produces and transmits a test signal to said control unit; said control unit produces and transmits a control signal to said multimedia testing module according to said test signal; said multimedia testing module outputs a first multimedia signal according to said control signal; said multimedia module of said tested device extracts said first multimedia signal; said multimedia module outputs a second multimedia signal according to said first multimedia signal; and said multimedia module extracts said second multimedia signal and compares said first multimedia signal with said second multimedia signal for testing the multimedia functions of said multimedia module.

8. The automatic testing apparatus of claim 7, wherein said multimedia module comprises a second video extraction unit and a second display unit; said first multimedia signal and said second multimedia signal are video signals; and said multimedia testing module comprises:
a first display unit, corresponding to said second video extraction unit, displaying said first multimedia signal according to said control signal, said second video extraction unit extracting said first multimedia signal, and said second display unit displaying said second multimedia signal according to said first video multimedia signal;
a first video extraction unit, corresponding to said second display unit, and extracting said second multimedia signal; and a video comparing unit, connected electrically to said first display unit and said first video extraction unit, comparing said second multimedia signal with said first multimedia signal for testing the video multimedia functions of said multimedia module.

9. The automatic testing apparatus of claim 8, wherein said multimedia module comprises a second audio extraction unit and a second playing unit; said first multimedia signal and said second multimedia signal are audio signals; and said multimedia testing module comprises:
a first playing unit, corresponding to said second audio extraction unit, playing said first multimedia signal according to said control signal, said second audio extraction unit extracting said first multimedia signal, and said second playing unit playing said second multimedia signal according to said first multimedia signal;
a first audio extraction unit, corresponding to said second playing unit, and extracting said second multimedia signal; and an audio comparing unit, connected electrically to said first playing unit and said first audio extraction unit, comparing said second multimedia signal with said first multimedia signal for testing the audio multimedia functions of said multimedia module.

10. The automatic testing apparatus of claim 1, wherein said peripheral device is a video port, and said testing platform further comprises a screen testing circuit, connected electrically to said driving testing unit, connected electrically to said video port of said tested device via said driving testing unit, and said tested device producing a video signal according to said testing program and outputting said video signal to said screen testing circuit for testing the video outputting functions of said video port.

11. The automatic testing apparatus of claim 1, wherein said testing platform further comprises an input/output testing circuit, connected electrically to said driving testing unit, connected electrically to an input/output port of said tested device via said driving testing unit for testing the hot-plug function of said input/output port.

12. The automatic testing apparatus of claim 11, wherein said input/output port is a USB port or a FireWire port (IEEE1394).

13. The automatic testing apparatus of claim 1, wherein said peripheral device is an audio line port, and said testing platform further comprises an audio testing circuit, connected electrically to said driving testing unit, connected electrically to said audio line port via said driving testing unit, said tested device producing and transmitting an audio signal to said audio line port according to said testing program, and testing said audio signal according to said audio line port for testing said audio line port.

14. The automatic testing apparatus of claim 1, wherein said peripheral device is an HDMI port, and said testing platform further comprises:

an audio/video-separation unit, connected electrically to said driving testing unit, connected electrically to said HDMI port and extracting an HDMI AV signal, and separating said HDMI AV signal and outputting a video signal and an audio signal;

an audio testing circuit, connected electrically to said audio/video-separation unit and receiving said audio signal for testing said audio signal of said HDMI AV signal; and a screen testing circuit, connected electrically to said audio/video-separation unit and receiving said video signal for testing said video signal of said HDMI AV signal.

15. The automatic testing apparatus of claim 1, wherein said driving testing unit comprises:

a driving control circuit, connected electrically to said control unit, and extracting said control signal;

an electromagnetic valve, connected electrically to said driving control circuit, and said driving control circuit driving on/off of said electromagnetic valve according to said control signal;

a pneumatic cylinder, connected to said electromagnetic valve; and a moving part, contacting a touch pad of said tested device and connected to said pneumatic cylinder, and said pneumatic cylinder driving said moving part to move on said touch pad for testing the touch functions of said touch pad according to the on/off state of said electromagnetic valve.

16. The automatic testing apparatus of claim 1, wherein said driving testing unit comprises:

a driving control circuit, connected electrically to said control unit; and a plurality of electromagnets, corresponding a plurality of keys of said tested device, connected electrically to said driving control circuit, and said driving control circuit driving said plurality of electromagnets to pressing said plurality of keys according to said control signal for testing the input functions of said plurality of keys.

17. An automatic testing apparatus, comprising:

a tested device, having a multimedia module, and storing a testing program; and a testing platform, having a fixing part, a control unit, and a multimedia testing module, said fixing part and said multimedia testing module located on a first side of said testing platform, said fixing part fixing said tested device on said first side of said testing platform, and said control unit connected electrically to said tested device;

where said tested device executes said testing program and produces and transmits a test signal to said control unit; said control unit produces and transmits a control signal to said multimedia testing module according to said test signal; said multimedia testing module outputs a first multimedia signal according to said control signal;

said multimedia module of said tested device extracts said first multimedia signal;

said multimedia module outputs a second multimedia signal according to said first multimedia signal;

said multimedia module extracts said second multimedia signal and compares said first multimedia signal with said second multimedia signal for testing the multimedia functions of said multimedia module;

said control unit transmits said control signal to a driving testing unit according to said test signal; and said driving testing unit drives said multimedia testing module according to said control signal for testing said multimedia module;

wherein said multimedia module comprises a second video extraction unit and a second display unit; said first multimedia signal and said second multimedia signal are video signals; and said multimedia testing module comprises:

a first display unit, corresponding to said second video extraction unit, displaying said first multimedia signal according to said control signal, said second video extraction unit extracting said first multimedia signal, and said second display unit displaying said second multimedia signal according to said first video multimedia signal;

a first video extraction unit, corresponding to said second display unit, and extracting said second multimedia signal; and a video comparing unit, connected electrically to said first display unit and said first video extraction unit, comparing said second multimedia signal with said first multimedia signal for testing the video multimedia functions of said multimedia module.

18. The automatic testing apparatus of claim 17, wherein said multimedia module comprises a second audio extraction unit and a second playing unit; said first multimedia signal and said second multimedia signal are audio signals; and said multimedia testing module comprises:

a first playing unit, corresponding to said second audio extraction unit, playing said first multimedia signal according to said control signal, said second audio extraction unit extracting said first multimedia signal, and said second playing unit playing said second multimedia signal according to said first multimedia signal extracted by said second audio extraction unit;

a first audio extraction unit, corresponding to said second playing unit, and extracting said second multimedia signal; and an audio comparing unit, connected electrically to said first playing unit and said first audio extraction unit, comparing said second multimedia signal with said first multimedia signal for testing the audio multimedia functions of said multimedia module.

19. The automatic testing apparatus of claim 17, wherein said multimedia module comprises a second audio extraction unit and a second playing unit; said first multimedia signal and said second multimedia signal are audio signals; and said multimedia testing module comprises:

a first playing unit, corresponding to said second audio extraction unit, playing said first multimedia signal according to said control signal, said second audio extraction unit extracting said first multimedia signal, and said second playing unit playing said second multimedia signal according to said first multimedia signal extracted by said second audio extraction unit;

a first audio extraction unit, corresponding to said second playing unit, and extracting said second multimedia signal; and an audio comparing unit, connected electrically to said first playing unit and said first audio extraction unit, comparing said second multimedia signal with said first multimedia signal for testing the audio multimedia functions of said multimedia module.

* * * * *